United States Patent [19]

Wirth et al.

[11] 3,918,572

[45] Nov. 11, 1975

[54] LATERAL DISCHARGE CHUTE AND GATE APPARATUS

[75] Inventors: Gary J. Wirth; Kenneth M. Gelder, both of Milwaukee, Wis.

[73] Assignee: Speaker Motion Systems, Inc., Milwaukee, Wis.

[22] Filed: May 9, 1974

[21] Appl. No.: 468,230

[52] U.S. Cl. .................. 198/66; 198/73; 198/38
[51] Int. Cl.² ......................................... B65G 47/34
[58] Field of Search ............ 198/38, 20, 26, 50, 52, 198/66, 72, 73; 209/125, 100, 74 R, 73; 214/11 R; 221/289

[56] References Cited
UNITED STATES PATENTS
2,442,025  5/1948   Smith ............................ 221/289 X
3,056,482  10/1962  Lanham et al. ................. 198/26 X
3,411,622  11/1968  Dickie ............................. 209/74 R Primary Examiner—Allen N. Knowles
Attorney, Agent, or Firm—Andrus, Sceales, Starke & Sawall

[57] ABSTRACT

A tilted belt sorter includes a belt angularly oriented with a guide wall at the lower belt edge to support parcels or other loads in longitudinal spaced relation. A plurality of downwardly moving adjacent gates are formed in the wall for lateral dropping discharging into chutes aligned with the gates. Each chute is secured to the top edge of the corresponding gate to prevent tumbling of the load when the gate is raised before the load has moved through the gate opening. The chute is pivotally coupled to the upper edge and pivotally and slidably coupled at the lower edge to the infeed end of a take-away conveyor. Each gate may be provided with a generally wedge-shaped trailing top.

9 Claims, 6 Drawing Figures

U.S. Patent  Nov. 11, 1975  3,918,572
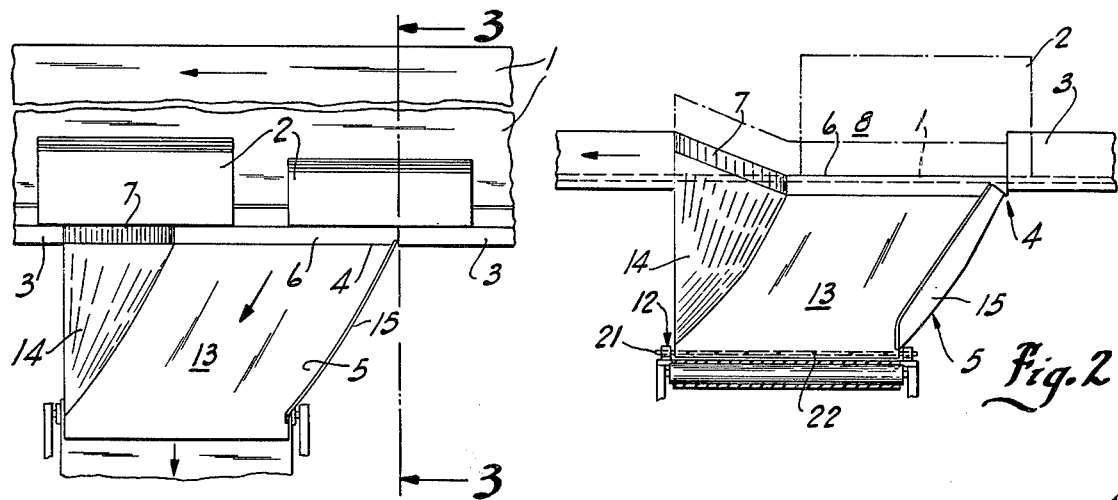
Fig. 1
Fig. 2
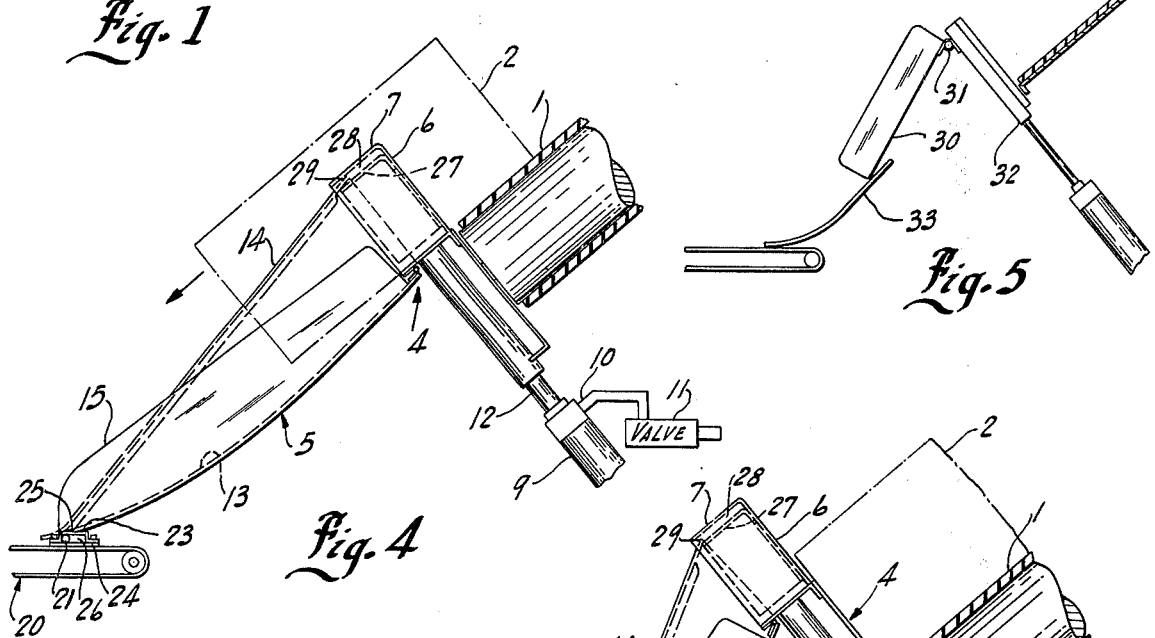
Fig. 4
Fig. 5
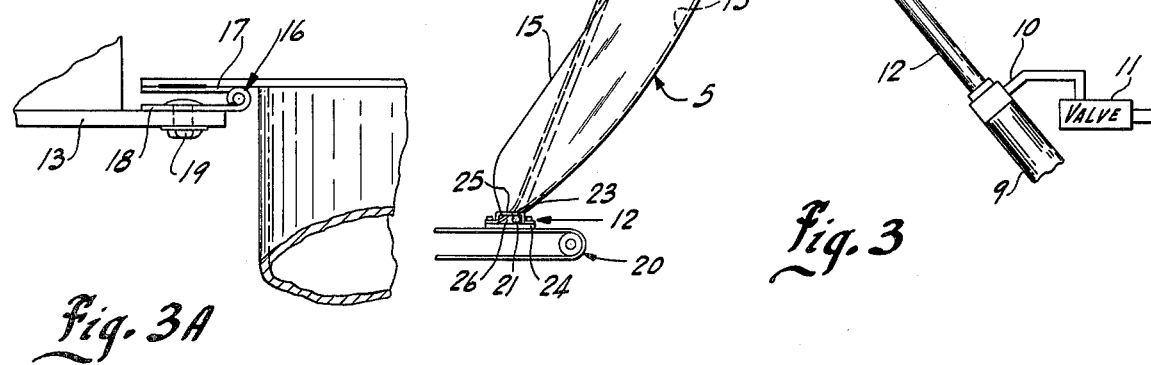
Fig. 3A
Fig. 3

LATERAL DISCHARGE CHUTE AND GATE APPARATUS

BACKGROUND OF THE INVENTION

The present invention relates to a lateral discharge apparatus for a conveyor and particularly to a discharge chute apparatus for high speed tilt belt conveyors.

In the transfer and sorting of various work units and articles for industrial and commercial application, the load units, or parcels, may be randomly carried by a conveying device and automatically discharged at appropriate discharge or receiving stations in accordance with some predetermined sorting plan. Various automatic sorting devices have been suggested for mechanical removal of the load units at the receiving station. A highly satisfactory high speed tilt belt sorter is shown in the copending application of Gary J. Wirth for "Conveyors With Lateral Discharge Apparatus," Ser. No. 428,922, filed Dec. 27, 1973. As more fully disclosed therein a load conveying belt is angularly oriented with respect to the horizontal and the articles are retained at the lower edge of the belt by a guide wall which extends upwardly normal to the belt plane. The guide wall includes specially constructed gates which can be dropped downwardly from the supporting position for allowing an aligned article to discharge under gravity forces. The gate is formed with an inclined closure wall portion located in the trailing portion of the gate window or opening with the gate dropped to the open position. The inclined wall extends from the belt plane upwardly to provide a partial stop wall which supports a unit while simultaneously permitting the convenient discharge of a trailing unit which has initiated its movement into the gate opening. Tilting belt type sorters with the special gate have been satisfactorily operated at a speed of the order of 400 feet per minute while maintaining reliable lateral discharge of conveyed units. Generally the gate action, apparently due to the increased velocity of the total system, is such that the inertia forces on the parcel or load permit the dropping of the gate and the initiation or raising of the gate long prior to the complete movement of the parcel through the gate. Although the tilt belt sorter with the special wedged gate structure provides a highly improved high speed sorter, it has been found that the rapid raising of the gate will, at times, result in a tumbling of the parcel rather than a highly desirable smooth discharge. This is particularly true where the raising of the gate is begun essentially in synchronism with the initial partial movement of the package through the gate. Thus, generally, the speed of the sorter must be related to the character of the parcels in order to permit proper discharge thereof.

SUMMARY OF THE PRESENT INVENTION

The present invention is particularly directed to a discharge chute and conveyor apparatus which permits the rapid raising of a gate type closure member while essentially preventing tumbling of the parcels. Generally, in accordance with the present invention the chute structure is mounted immediately adjacent to the gate and the receiving end of the chute is maintained aligned with the upper wall of the gate by moving of at least the adjacent portion of the chute means simultaneously and in synchronism with the gate to maintain a continuous, discharge surface.

In accordance with a particularly novel and practical construction and aspect of the present invention, the upper end of the chute is secured to the upper end of the gate and moves therewith to maintain the continuous discharge surface. The chute is formed as a relatively rigid support with the lower end slidably mounted to permit the raising and lowering of the gate and the interconnected chute structure. More particularly, as applied to the wedged type gate structure, the chute is generally a channel-shaped member having a base support wall and a trailing curved wall secured to the wedged shaped portion. The base or bottom wall is pivotally secured to the upper rectilinear portion of the gate. The bottom end of the base wall is provided with a guide bar slidably guided in longitudinal guide members which permit the lower end of the chute structure to move laterally of the chute and sorter as the upper end moves with the gate.

Applicants have found that the present invention essentially eliminates parcel tumbling by maintaining of a smooth continuous discharge surface and permits optimum operation of the sorter.

The gate and chute structure of the invention improves the discharge characteristics of a belt sorter or the like by further ensuring complete discharge of the parcel even though the gate closure is initiated prior to complete passage through the opening and thereby increases the operating speed and capacity of the system.

BRIEF DESCRIPTION OF THE DRAWING

The drawing furnished herewith illustrates the best mode presently contemplated by the inventors for carrying out the invention in which the above advantages and features are clearly disclosed as well as others which will be readily understood from the following description.

In the drawing:

FIG. 1 is a fragmentary plan view of a tilt belt sorter employing a gate and chute structure constructed in accordance with the present invention;

FIG. 2 is a front elevational view of FIG. 1;

FIG. 3 is a vertical section taken generally on line 2—2 of FIG. 1 to clearly illustrate the gate and chute structure;

FIG. 3a is an enlarged fragmentary view of FIG. 3;

FIG. 4 is a view similar to FIG. 3 illustrating the alternate position of the gate and chute structure; and FIG. 5 is a view of a further embodiment.

DESCRIPTION OF ILLUSTRATED EMBODIMENTS

Referring to the drawing and particularly in FIG. 1, the invention is illustrated in connection with a tilt belt sorter which includes an inclined endless belt 1 suitably mounted for rectilinear movement with a plurality of parcels 2 supported in longitudinally, spaced relation thereon. The belt is mounted, as more clearly illustrated in FIG. 3, at an incline to the horizontal plane such that the parcels or articles 2 ride downwardly to the lower edge of the belt 1. A guide or stop wall 3 is formed along the lower edge of the belt 1 to positively support the parcels 2 for linear movement with the belt 1. The wall 3 is provided with a plurality of one or more similar discharge gates 4 of which only one is shown aligned with a non-tumble chute structure 5 which particularly forms the subject matter of the present invention. Each gate 4, as more fully disclosed in the aforesaid copending application entitled "Conveyors With Lateral Discharge Apparatus" of Gary J. Wirth, moves vertically downwardly below the level of the belt 1 to permit gravity discharge of aligned parcels 2. The parcels 2 may be any suitable individual packages or units which it is desired to selectively sort at predetermined stations. Thus, generally, the present invention may conveniently be applied, for example, to a post office operation where parcels are separated by predetermined areas or groupings. Similarly, warehousing order separation is preferably done through an automatic sorting mechanism such as shown by random feeding of parcels 2 to a tilt belt sorter, with the automatic actuation of the gate 4 to discharge the parcels 2 at appropriately key coded discharge chute 5. Each gate 4 has a rectilinear or flat trailing top wall 6 and a trailing wedge shaped portion 7 which spans substantially less than the total length of the opening 8 such that when gate 4 is dropped there is an entrance portion of the discharge opening or window for the discharging parcel 2 and a partially closed portion defined by the wedge shaped structure as shown in FIG. 2. The parcel 2 may not be completely transferred through the complete open portion and be propelled into engagement with the inclined portion 7 and move thereover into and downwardly through the novel chute structure 5. The gates 4 are shown supported by a suitable pneumatic cylinder unit 9 located beneath belt 1. The cylinder unit 9 includes a fixed cylinder 10 coupled to a suitable pneumatic pressure supply through a solenoid controlled valve unit 11. The piston rod 12 of the cylinder unit 9 is coupled to the gate 4 and holds the gate 4 in the raised closing position with the cylinder unit 9 supplied with fluid pressure. When a parcel approaches the appropriate gate 4, the cylinder unit 9 is activated to rapidly retract and thereby lower the gate 4 with the flat, top wall 6 of gate 4 in the plane of the belt 1 to form an extension thereof into the chute 5, as shown in FIG. 4. When a parcel approaches the appropriate gate 4, the cylinder unit 9 is activated to rapidly retract and thereby lower the gate 4 with the flat, top wall 6 of gate 4 in the plane of the belt 1 to form an extension thereof into the chute 5.

As noted in the above-identified application, in high speed sorting, a gate 4 can be lowered and generally the raising movement initiated long prior to the actual complete movement of the parcel 2 through the gate opening 8. In fact, the gate 4 may be started to close upwardly to the closed position immediately after the package or parcel 2 has moved over the upper wall 6 of the gate 4 as such. However, with a conventional fixed chute Applicants found that the parcel 2, at times, would tend to be raised and fall into the chute 5 with an undesirable tumbling action. In accordance with the present invention the chute 5 is specially constructed to raise and fall with gate 4 and has been found to eliminate such tumbling.

The illustrated chute 5 which is constructed in accordance with the present invention is generally a channel shaped member having a slightly concave base wall 13, a curved trailing side wall 14 and a flat back or leading side wall 15. The chute 5 may be conveniently formed of a relatively rigid plastic by a vacuum forming process with integral base and side walls. In accordance with the teaching of the present invention, the upper edge portion of the tray chute 5 is mounted to move in synchronism with the reciprocal movement of the gate 4 between the position shown in FIGS. 3 and 4 and with the bottom edge movable laterally of the tilt belt sorter 1 to accomodate the vertical movement of the chute 5. In the illustrated embodiment of the invention, wall 13 is coupled to the straight top wall 6 of gate 4, the trailing curved side wall 14 has its upper edge coupled to the wedged shaped top wall 7 of gate 4 to maintain a continuous smooth, guiding surface from such portion of the gate 4 into the chute 5 and particularly the base wall 13. More particularly the base wall 13 projects beneath the top gate wall 6 and is suitably secured thereto by a piano-type hinge 16. In the illustrated embodiment, one lip or leg 17 of the hinge 16 is welded or otherwise secured to the underside of the gate wall 6 and the other lip or leg 18 is riveted as by a plurality of longitudinally spaced rivets 19 to the upper edge portion of the chute base 13. The chute base 13 extends downwardly with a slight curvature to the bottom edge mounted in overlying relationship to a conveyor 20 for receiving of a parcel 2 as it slides from the chute 5. The bottom portion of the chute 5 is supported on a slide rod or bar 21 which is suitably secured as by pins 22 to the underside of the base 12 in slightly spaced relation to the outermost edge thereof. The slide bar 21 extends throughout the width of the base and laterally from the opposite edges of the tray base 12 as most clearly shown in FIG. 2. The opposite ends of the bar 21 are slidably disposed within suitable slide blocks 23 secured to a suitably supporting structure 24 such as a part of the conveyor 20. The illustrated slide blocks 23 include generally inverted U-shaped strap members 25 defining an elongated longitudinal guide slot 26 extending laterally of the sorter and parallel to the movement of the parcels 2 down the chute 5.

In operation as the gate moves upwardly, the upper end of the chute base 13 moves with the gate 4 and the lower end is retracted over the take-away conveyor 20, with the slide bar 21 moving to the right within the guide slot 26 as shown in FIGS. 3 and 4 to the position of FIG. 3. When the gate 4 drops to discharge a package or parcel 2 the upper end of the gate 4 and the interconnected hinged chute base 13 simultaneously move downwardly, with collapsing of the hinge 16 and pivotal movement of the upper end of the chute 5 relative to the rectilinearly moving top gate wall 6. The slide bar 21 moves within the longitudinal slot defined by the slide bar to guide the chute to the forward position illustrated in FIG. 4.

As previously noted, under certain conditions of rapid sorting, a parcel 2 may move upwardly over the inclined wall portion 7. In accordance with the teaching of the present invention, upper edge of the side wall 14 of the chute 5 is connected to such inclined wall 7 to define a continuous supporting and guiding surface. In the drawings, the wall 14 is integrally secured to the edge of the base 13. Wall 14 projects from the base 13 in the direction of travel with the outermost edge extending perpendicularly to the sorter belt 1 from the side edge of the inclined wall 7. The top of the inclined portion is formed with an outer edge opening defined by the outermost top wall 7 and downwardly spaced inner wall 27. The inner wall is of a somewhat shorter length than the outermost top wall 7 and defines a receiving gap or opening 28 within which the uppermost edge of the curved trailing wall 14 projects as at 29. The spacing of the outer and inner walls 7 and 27 in the inclined wall portion permits a relative sliding movement of the top edge of chute 5 as the supporting hinge 16 pivots as illustrated in FIGS. 3 and 4. A parcel 2 which moves upwardly over the inclined wall 7 moves directly onto the wall 14 directed thereby downwardly and rearwardly into the chute 5.

An alternate unit is shown in FIG. 5 employing a discharge chute 30 hinged to the upper wall 31 of a gate 32 and with the lower end slidably disposed within a curved chute extension 33.

This provides a very simple and reliable means of maintaining a smooth continuous discharge surface with the resulting elimination of the tumbling type discharge. Any other means might, of course, be provided to maintain the continuous synchronous movement between the upper edge of the chute structure and the upper wall of the gate. The mechanical connection and interlock provides a simple, reliable and inexpensive construction. For example, a flexible chute structure might be employed with the upper edge connected to an otherwise driven in synchronism with the upper wall of a gate structure. The present invention thus provides a simple reliable chute and gate structure particularly adapted for high speed sorting and the like.

Various modes of carrying out the invention are contemplated as being within the scope of the following claims, particularly pointing out and distinctly claiming the subject matter which is regarded as the invention.

We claim:

1. A conveying apparatus, comprising a first elongated conveying means of a generally planar support and longitudinally movable for moving a plurality of individual load units in physically longitudinally spaced relationship in one direction and selectively laterally removing of said units from said conveying means at a preselected discharge station, discharge gate means in the lateral path of the load units and defining a stop wall, means for lowering of said gate means with respect to said conveying means and load units to thereby permit lateral discharge, a receiving chute means aligned with the gate means to receive a load unit, and means to move the upper end of the chute means with the gate means.

2. The conveying apparatus of claim 1 wherein said gate means moves linearly along a path normal to the plane of the conveying means, said receiving chute means is a rigid member having the upper end secured to the upper end of the gate means.

3. A conveying apparatus for moving a plurality of individual load units in physically longitudinally spaced relationship in one direction and selectively laterally moving of said units at preselected discharge stations, comprising discharge gate means in the lateral path of the load units and defining stop walls, means for lowering of said gate means with respect to said load units to thereby permit lateral discharge, a receiving chute means aligned with the gate means to receive a load, means to move the upper end of the chute means with the gate means, said receiving chute means includes an upper portion pivotally interconnected to the upper wall of the gate means to maintain a continuous discharge surface from the upper wall of the gate means downwardly through the chute means.

4. The conveying apparatus of claim 3 wherein said receiving chute means includes a lower movable edge portion to maintain a continuous discharge surface from the upper wall of the gate means downwardly through the chute means, the lower end being mounted for lateral movement of the gate means.

5. A conveying apparatus for moving a plurality of individual load units in physically longitudinally spaced relationship in one direction and selectively laterally moving of said units at preselected discharge stations, comprising discharge gate means in the lateral path of load units and defining stop walls, means for lowering of said gate means with respect to said load units to thereby permit lateral discharge, a receiving chute means aligned with the gate means to receive a load unit, means to move the upper end of the chute means with the gate means, said gate means includes an inclined trailing wall portion extending forwardly and upwardly from a rectilinear wall portion, said rectilinear wall portion being adapted to lie in the plane of a supporting discharge surface with the gate means in the lowered position, said chute means having a trailing sidewall portion coupled to said inclined wall portion.

6. The conveying apparatus of claim 5 wherein said inclined trailing wall portion includes an outer edge opening, and said chute means includes a trailing sidewall integrally secured to a base wall and extending in the direction of parcel movement throughout the extent of said inclined portion, the upper edge of said trailing sidewall being a planar portion projecting inwardly into said outer edge opening.

7. The conveying apparatus of claim 5 wherein said rectilinear portion includes a top wall having an outwardly projecting lip portion, said inclined wall portion includes a top outer wall and an inwardly spaced parallel inner wall defining a longitudinal opening therebetween, said chute means including a relatively rigid base wall of a width corresponding to said rectilinear portion and having an upper edge located beneath said lip, a hinge means interconnected to said underside of said lip and to the upper end of said chute base wall, said chute means having a trailing wall integrally secured to the leading edge of the base wall and extending in the direction of parcel movement throughout the extent of said inclined portion, the upper edge of said trailing wall being a planar portion projecting inwardly between the outer and inner top walls of the inclined portion and permitting relative pivotal movement of the trailing wall within said opening.

8. The conveying apparatus of claim 7 having a slide bar secured to the undersurface to the underside of the base wall adjacent to the lower edge thereof, slide blocks secured to the opposite sides in fixed relation to the opposite sides of said base wall with slide bar slidably guided therein.

9. A conveying apparatus for moving a plurality of individual load units in physically longitudinally spaced relationship in one direction and selectively laterally moving of said units at preselected discharge stations, comprising discharge gate means in the lateral path of load units and defining stop walls, means for lowering of said gate means with respect to said load units to thereby permit lateral discharge, a receiving chute means aligned with the gate means to receive a load units means to move the upper end of the chute means with the gate means, said gate means includes a rectilinear top wall having an outwardly projecting lip portion, said chute means including a relatively rigid base wall of a width corresponding to said rectilinear portion and having an upper edge located beneath said lip, a hinge means interconnected to said underside of said lip and to the upper end of said chute base wall.

* * * * *

UNITED STATES PATENT AND TRADEMARK OFFICE
CERTIFICATE OF CORRECTION

PATENT NO. : 3,918,572
DATED : NOVEMBER 11, 1975
INVENTOR(S) : GARY J. WIRTH and KENNETH M. GELDER It is certified that error appears in the above-identified patent and that said Letters Patent are hereby corrected as shown below:

Column 6, Line 59, at the beginning of the line
CLAIM 9
cancel "units" and insert
--- unit, ---.

Signed and Sealed this sixteenth Day of March 1976

[SEAL]

Attest:

RUTH C. MASON
Attesting Officer

C. MARSHALL DANN
Commissioner of Patents and Trademarks